March 11, 1958    H. SHAW ET AL    2,825,973
DIMENSION-INDICATING DEVICE
Filed May 13, 1954    3 Sheets-Sheet 1

United States Patent Office 2,825,973
Patented Mar. 11, 1958

2,825,973

DIMENSION-INDICATING DEVICE

Harry Shaw, Farnborough, and Alfred John Walsham, Aldershot, England, assignors to Power Jets (Research and Development) Limited, London, England, a British company Application May 13, 1954, Serial No. 429,577

Claims priority, application Great Britain May 20, 1953

3 Claims. (Cl. 33—172)

To measure the blade tip clearance in such a machine as an elastic-fluid turbine or an axial-flow compressor by the insertion of a probe it is desirable to avoid actual mechanical contact between probe and blade. On the other hand, measurement of this clearance by measuring a gap between a blade and an electrode—e. g. by measuring their electrostatic capacity—is liable to errors which it is desirable to avoid by a method of measuring clearance by mechanical measurement of the movement of a probe. Similar considerations arise in the measurement of other dimensions.

The present invention has for its object a method of the latter kind wherein mechanical contact is unnecessary. According to the invention, in order to measure the distance of an end of an object from a datum level a probe is advanced towards the object until, under the action of a control system responsive to very close proximity of the object to the probe, the latter is brought to a floating condition at a predetermined small clearance distance from the object; the distance of the probe from the reference datum is indicated or recorded. In particular, the probe may be driven by means which, in response to proximity, can momentarily reverse to withdraw the probe and then feed it forward again, and so on, until the probe is brought to a floating state of steady oscillation.

One form of the invention suitable for measuring blade tip clearance in an axial-flow compressor or turbine is shown in the accompanying drawings, of which Fig. 1 shows a complete probe unit, for mounting on a compressor, in longitudinal section through the probe;

Figure 2:
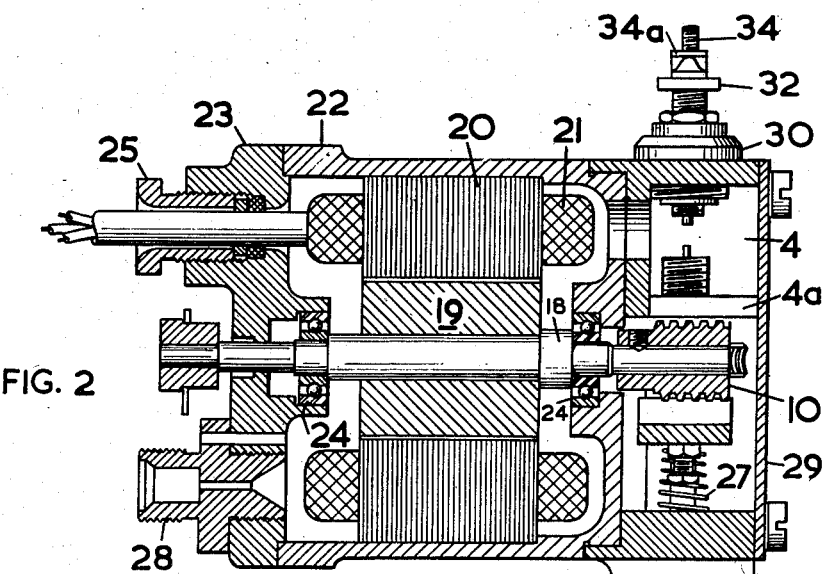
Fig. 2 shows the same unit in axial section through the driving shaft.
Figure 1:
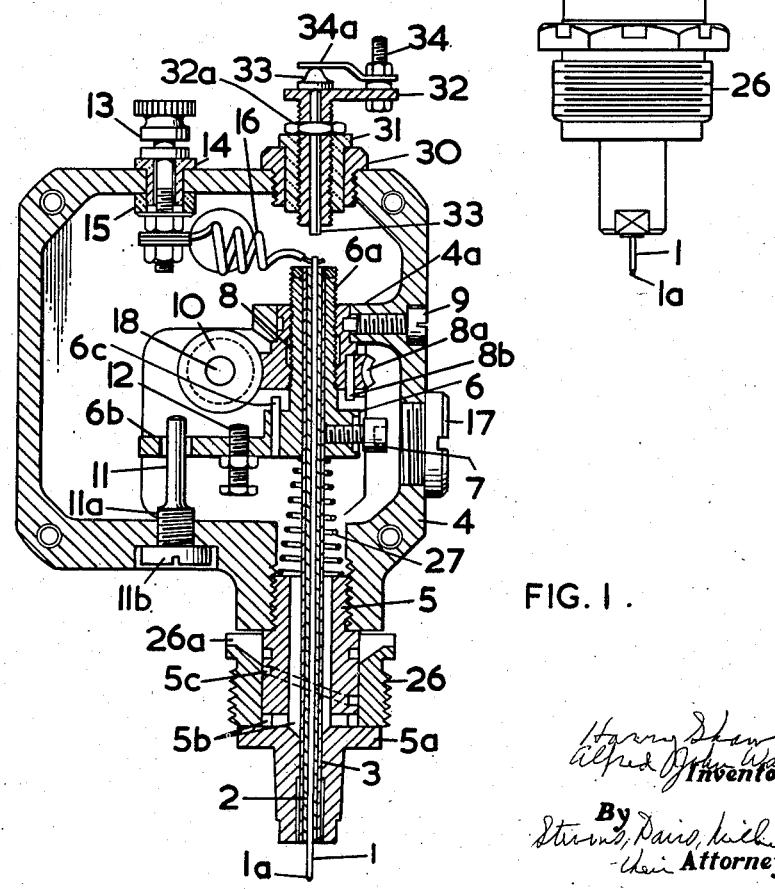

In Figs. 1 and 2 a probe 1 in the form of a slender metal wire rod with a blunt point 1a at its lower end forms part of a probe unit slidable in a casing unit made up of casing 4 and mounting sleeve 5, from the bottom of which the point 1a protrudes. (It is assumed that the casing 4 is held in the position for mounting on the top of an axial flow turbine or compressor.)

In order that the probe be electrically insulated from the casing, the probe unit is made up of the probe 1 itself, an insulating tube 2 or wrapping around the probe, and an outer metal tube 3. At its upper end the tube 3 enters the probe unit holder 6 and is adjustably gripped by a pinch screw 7; at its lower end it slides through the sleeve 5. The holder 6 has a screw-threaded stem 6a and a lateral extension 6b restrained against rotation by being slidably mounted on a guide peg 11, fixed in casing 4. Around the screw-threaded stem 6a is a nut 8 formed externally at 8a as a worm wheel and mounted in the part 4a of the casing for rotation but restrained by stop screw 9 against axial movement. A worm 10 meshes with the worm wheel. An adjustable screw-threaded limit stop 12 on the underside of the holder extension 6b can engage the casing to limit the downward movement of the probe unit. For limiting the upward movement—i. e. the retracting movement—there is an electrical contact back stop which determines the datum position and mechanical stops which arrest the probe on overrun beyond said position. The latter consist of the stop pin 6c projecting from and travelling up with the holder 6 and the stop peg 8b rotating with the nut 8. The former consists of the sleeve 30 screwed into casing 4, the internally threaded bush 31 lining the sleeve 30, one of these two being an electric insulator, the contact holder 32, adjustable by being screwed up and down through bush 31 and locked by locknut 32a, the headed contact pin 33 slidable through holder 32 and the terminal 34 with stiff spring 34a, bearing on the contact 33.

Electrical connection is made to the upper end of the probe 1 by a flexible cable 16 connected to a terminal 13 mounted in the casing by insulating bush 14 and washer 15. As an alternative the probe unit may be entirely metallic and insulated from the holder, a bush through which the lower end of the unit slides being insulated from the casing.

The guide peg 11 has a screw-threaded part 11a screwed into the casing 4 up to the head 11b. A screw-threaded plug 17 can be removed from the casing 4 to give access to the pinch screw 7.

The worm 10 is mounted on and driven by the shaft 18 of a driving motor which includes the usual rotor 19 on shaft 18 and the enveloping stator core 20 with stator winding 21, in casing 22 which is mounted on the back of the casing 4; the rear of casing 22 is closed by end cover 23. Bearings 24 for shaft 18 are carried by casing 22 and end cover 23. Electrical connections to the windings are introduced in usual manner through gland 25. The motor may be the repeater motor of an electric synchronous movement, as hereinafter set forth.

The sleeve 5, through which the probe unit projects, is screwed into a boss on casing 4 and serves for fixing the whole device on the compressor or turbine casing in accurate relationship, and constitutes the guide bush for the lower end of the probe unit. A light spring 27 compressed between the top of the sleeve 5 and the underside of the probe holder 6 takes up any backlash between the screw-threaded part 6a of the holder and the rotary nut 8. A captive screw-threaded sleeve 26 is retained between the boss and a flange 5a on the element 5, with slight axial clearance to allow for free rotation of the element 26. The underside of the flange 5a forms a reference surface which can locate the device accurately relatively to the stator of the compressor or turbine by engaging a corresponding surface—such as the bottom of a tapped hole against which it is clamped by screwing element 26 into the hole. Alternatively the captive element 26 may be tapped for screwing over an externally threaded boss on the stator casing.

An inlet 28 in the end cover 23 can be connected to a source of cooling air under pressure, so that air can enter casing 22 and flow first of all over the driving motor, thence into casing 4 and over the probe unit to the element 5 to cool the part of the unit nearest to and accordingly heated by the turbine; the air can flow through holes 5b in the element 5 into a helical groove 5c around the outside of the latter element and so out through vent openings 26a in the screw-threaded element 26.

Figure 3:
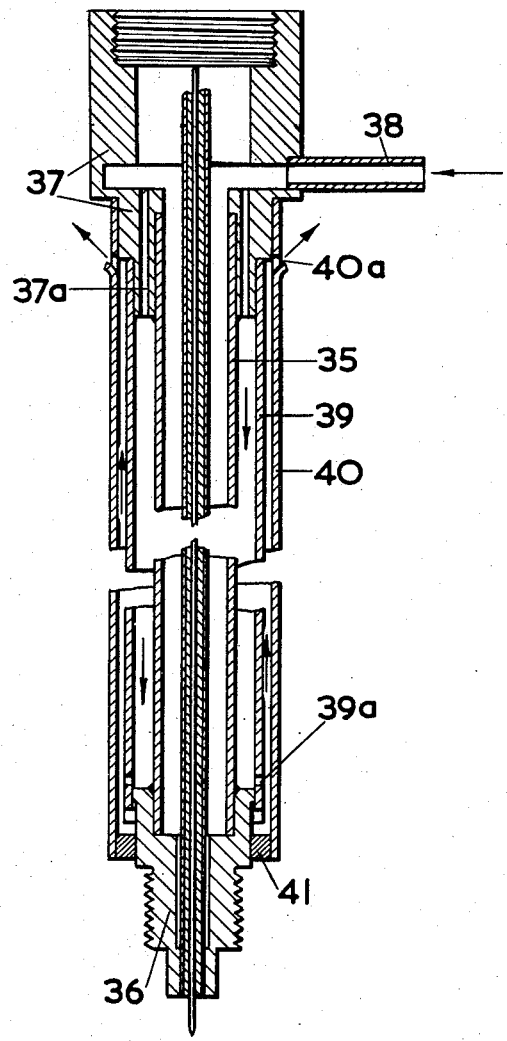
Fig. 3 shows, in section, an extension stem for mounting the unit of Figs. 1 and 2 on a high temperature machine.

The front of the casing 4 is closed by the sheet metal cover 29. The above arrangement will serve for attaching directly to a compressor or low-temperature turbine. Generally however for attaching to a turbine the device will need to be kept at a distance from the hot stator by being mounted on a cooled tubular extension stem. In the construction shown in Fig. 3 an inner tube 35 has a plug 36 at its lower end for screwing into the turbine stator and a head 37 at its upper end for abutting against flange 5a. The lower end of plug 36 and the upper end of head 37 form reference surfaces machined to a determined distance apart. A cavity in head 37, which can be connected by inlet pipe 38 to the source of cooling air under pressure, communicates with the interior of a cooling jacket formed around the tube 35 by enveloping tubes 39 and 40, each of which is secured at one end only and free at the other to allow axially for differential thermal expansion. Tubes 39 and 40 are shown as fixed to head 37; the lower end of tube 39 and a tubular plug 41 closing the lower end of tube 40 are slidable on element 36. Cooling air coming through holes 37a in head 37 can flow down between tubes 35 and 39, through holes 39a in tube 39 and up between tubes 39 and 40, finally emerging through holes 40a. The captive element 26 on the casing screws into head 37 to clamp the top of the head against flange 5a. If the device is always to be used with an extension stem a captive nut could be provided on the top end of the stem instead of screw-threaded element 26 on the casing. The provision of the substantially accurately spaced reference surfaces at each end of the extension stem, in combination with the reference surfaces on the turbine stator and on the flange 5a, insures that the probe is correctly positioned in relation to the hot stator. When the device is used with the extension stem the probe unit of Fig. 1 is replaced by a longer one.

Figure 4:
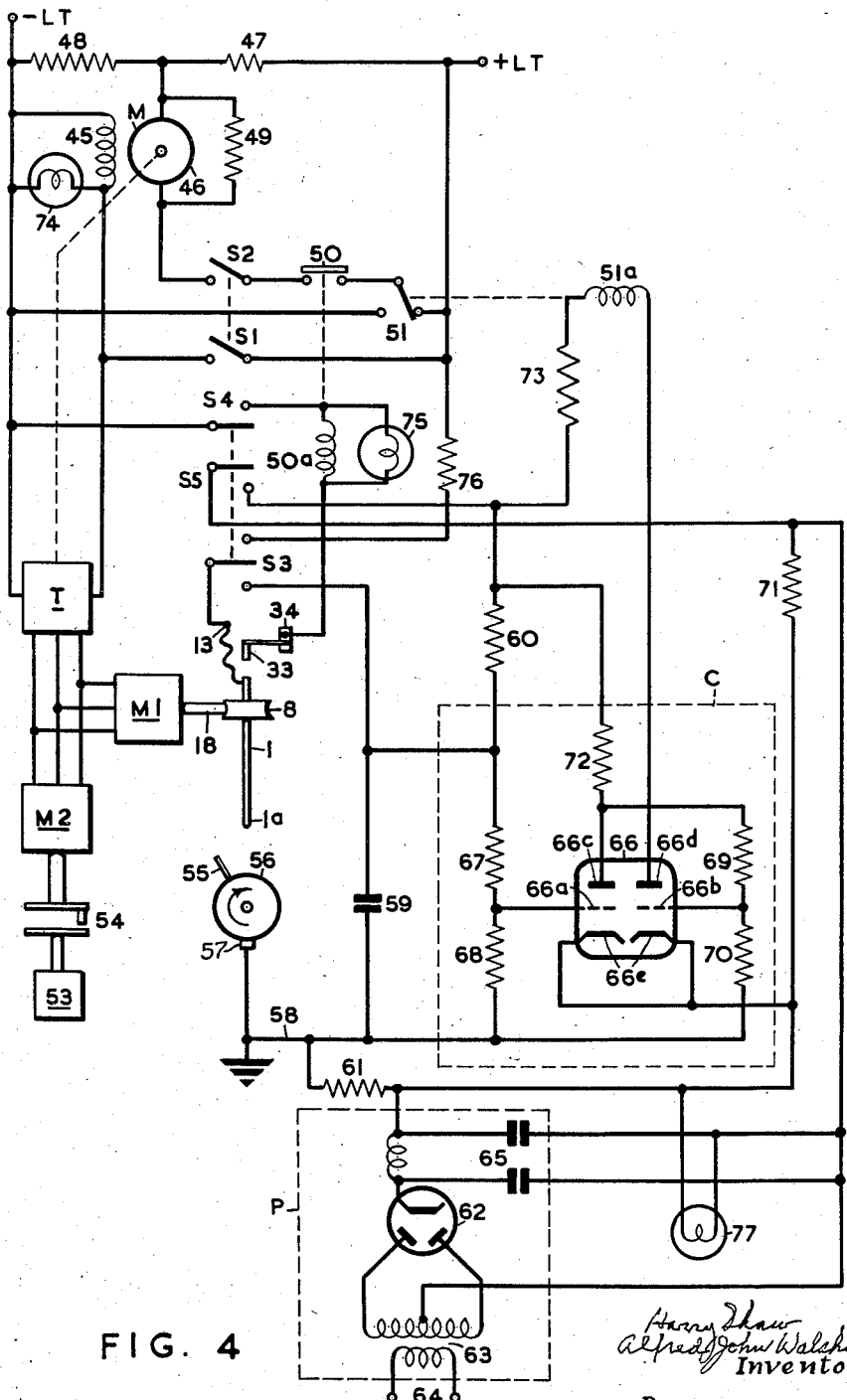
Fig. 4 shows diagrammatically the complete equipment, with electrical connections.

The complete scheme is shown in Fig. 4. The mechanical power for advancing and retarding the probe 1 comes from a D. C. electric motor M having a field winding 45 and an armature 46, the latter connected to a potentiometer system by means of which the voltage across it can be reversed, and the former connected through switch S1 to the terminals +LT and —LT of a comparatively low voltage D. C. supply—e. g. at 24 volts. This motor M drives the transmitter T of a synchronous electric movement of which the receiver motor M1 is the motor which drives the worm wheel 8 for driving the probe 1. A position indicating counter or recorder 53 for the probe is driven by a second receiver motor M2 through coupling 54 by which it can be readily temporarily disengaged for setting to zero. Any form of synchronous movement can be used; the transmitter may be a winding rotating in an A. C. field system connected to the same A. C. supply as the field winding of each receiver motor or preferably it is a set of switchgear connecting each phase in turn of the field windings of the receiver motors to the D. C. supply terminals +LT and —LT.

The potentiometer arrangement consists of resistances 47 and 48 connected in series between terminals +LT and —LT. One side of armature 46 is connected to the junction of the resistances while the other side is connected through switch S2 and relay 50 to the change-over relay 51 by which it can be connected either to terminal +LT or to terminal —LT. Thus operation of the change-over relay contacts 51 will reverse the direction of rotation of the motor M, the braking being rapid. Resistance 49 is connected in parallel with the armature 46. The resistance 47 is smaller than resistance 48 so that operation of relay 51 will alter the voltage across the armature and hence the speed of the motor to give the desired ratio of rate of retraction to rate of feeding of the probe; a suitable condition is for the rate of retraction to be approximately three times the rate of feed.

According to the invention there are means for controlling the motor M so that it rotates in the direction for driving the probe unit—through the synchronous movement comprising T and M1—in the direction for feeding the probe 1 downwards until the point 1a of the probe has approached very close to the blade 55 of rotor 56, then retracting and again feeding the probe until the probe is brought to a floating state with the point 1a just clear of the rotor blades, or the highest blade. To this end an electrostatic condenser or capacitor 59 which can be charged to a suitable voltage of the order of about 400–600 volts can be connected by changeover switch S3 between the probe and the line 58 which is connected to earth and to a brush 57 making contact with the rotor 56. The capacitor 59 is normally charged but when the probe 1 is within sparking distance of the tip of a blade 55 the capacitor will discharge across this system and then commence to recharge. An electronic control system as hereinafter described and responsive to current in the capacitor circuit when the capacitor is being charged controls the relay 51 so that the relay is de-energised and the armature is connected across the resistance 48 for retracting the probe during the momentary charging of the capacitor; on return to the normal state of capacitor charge, the relay 51 is again energised and restores the original connection of the armature across the resistance 47 and the motor direction is returned to that for feeding the probe towards the rotor again.

Switches S1, S2, S3, S4 and S5 are manual switches, operable at will, to complete various circuits or to disconnect them, to set the device for use or to connect the motor M for retracting the probe unit 1. They are mechanically interconnected so that S2 is closed only when S1 is closed, S4 is closed only when S3 is in its upper position disconnecting the probe from the combination P and C and S5 is open to de-energize relay coil 51a, while switch S5 is closed only when switch S3 is in its lower position. A signal lamp 74 in the circuit of the motor field winding 45 may show that the supply is switched on by switches S1 and S2. A second lamp 75 in the circuit of winding 50a may show when the probe is retracted. Another lamp 77 can show that the power pack is functioning.

The switch S3 has an upper position in which the probe is connected through terminal 13, the switch S3 and resistance 76 to the terminal +LT. Relay 51 is then in its left-hand position and the motor M retracts the probe 1 until the latter engages the back contact 33, making a circuit from terminal +LT by way of terminal 34 through relay coil 50a and switch S4 to terminal —LT, whereupon relay 50 opens the circuit of armature 46 and stops the motor.

When the switch S3 is in its lower position and switch S5 is closed, the capacitor 59 and the parallel system formed by the probe 1, the blade 55 and rotor 56 are connected in series with resistances 60 and 61 across the rectified voltage derived from the power pack P which comprises a combination of rectifier valves (such as valve 62), transformers such as transformer 63 connected to the A. C. supply 64, and smoothing devices such as the choke and capacitor combination 65. Capacitor 59 is thus normally charged. The combination P is also connected across resistance 71 and the electronic control device C which includes for example various resistances and the double triode 66. The latter has its cathodes 66e connected through resistance 61 to the negative line 58 and one plate of the condenser 59, and its grid 66a connected to an intermediate point between resistances 67 and 68 connected across the condenser 59. Grid 66b is connected to an intermediate point between resistances 69 and 70. The various resistances are so proportioned that during steady charge of the capacitor 59 the grids 66a and 66b are negative and positive respectively relatively to the cathodes and the valve is non-conducting from anode 66c to the cathodes 66e but conducting from anode 66d to the cathodes 66e. The coil 51a operating relay 51 and resistance 73 are connected in the latter path. During recharging of the capacitor the grid 66a becomes positive relatively to the cathodes and current flows through resistance 72 to anode 66c. The grid 66b then becomes negative, due to the voltage drop in resistance 72, whereby relay coil 51a is de-energised. The resulting movement of the relay contacts then momentarily reverses the polarity of armature 46 and reverses the motor M. When the capacitor 59 has become fully charged the valve again allows current to pass to energize the relay coil 51a.

The probe device is assembled with the probe retracted so that stop pin 6c and stop peg 8b are not touching. The point 1a of the probe is set in a definite position relatively to the undersurface of the flange (so that when the device is set up in a compressor or turbine the point would be in a definite position relatively to the axis of the machine); the electric contact back-stop is then adjusted so that contact 33 engages the upper end of the probe 1, and is locked by locknut 32a. The whole combination can then be electrically connected together and the device is ready for use. In use, the switches S3, S4 and S5 are first set for retraction. The motor can then run in reverse and, through the synchronous movement T—M₁—M₂, retract the probe until it is against the back stop and at the same time correspondingly drive the counter or recorder 53, which should then be temporarily uncoupled, set to zero, and reconnected by coupling 54. With the valves in the power pack at operating temperature, the switches are then set for normal operation; the motor runs in its normal direction and drives the worm gear and the counter (through the synchronous movements) until the probe 1 is almost in contact with the blades, when the capacitor 59 discharges across the small gap. At once the power unit P commences to recharge the capacitor, the valve de-energises the relay coil 51a which operates its contacts 51 to reverse the motor M and momentarily retract the probe while the capacitor is charging. When the capacitor is recharged the motor M will again reverse to feed the probe, and so on until the probe is brought to a floating state with its point just clear of the rotor blades. The position-indicating or recording counter 53 will have recorded the movement of the probe unit from the back stop and can be read to show the position of the point of the probe; moreover it will continuously show change of position of the probe with relative thermal expansion of the rotor and stator. A number of devices according to the invention distributed around a turbine will show if there is uniform expansion or distortion. The device 53 can be of the kind which makes a record on a chart, and furthermore when it is at less than a certain distance from zero it may actuate an alarm to give warning that blade tip convenient for the counter 53 and coupling 54 to be directly driven by motor M1 and the use of the synchronous movement allows the counter to be in any convenient position remote from the probe device. The counter and coupling could be directly driven by the motor M, with transmitter T. If however motor M be mounted on the probe device in place of motor M1 it would preferably still drive the transmitter T so that the counter 53 could be remote and driven by receiver motor M2.

It is a valuable feature of the invention that the device can be used on a turbine or compressor during rotation at high speed and it will indicate the position of the tip of the longest blade of a row. The control arrangement should hold the probe just clear of such blade and prevent the probe from being advanced into the gap between adjacent blades. The device can be used for other purposes on a turbine, such as checking the end clearance and any change of such clearance due to changes in the thrust bearings. It can be used for checking clearances in other rotating machines, as well as for the general purpose of checking lengths of objects. Thus it may for example be used to check the diameter of a gear wheel during rotation.

It will be understood that the power and control arrangements shown are simplified representations of typical possible arrangements but that others can be used. Thus thyratron or like grid-controlled vapour rectifiers may take the place of relay 51. The control could respond to the discharge of the capacitor—i. e. it could respond to any current in the capacitor circuit.

We claim:

1. A device for measuring the distance of an end of an object from a datum level comprising in combination, a probe, means for advancing the probe point towards the object, means for indicating the distance of the probe point from said datum level, a capacitor connected across the gap between the probe point and the object, means for maintaining such a charging potential across the capacitor that the latter will discharge across said gap when the probe point and the object are in very close proximity and means for maintaining the probe point floating just clear of the object comprising means responsive to any current in the capacitor circuit for retracting the probe point from the object and means responsive to cessation of current in said circuit for moving the probe point towards the object.

2. A device for measuring the distance of an end of an object from a datum level comprising in combination, a movable probe, reversible driving means for advancing the probe point towards and retracting it from said object, means for indicating the distance of the probe point from said datum level, a capacitor connected between the probe and the object and adapted to discharge across the gap between probe and object when the gap width is reduced to a predetermined small value, means for recharging the capacitor after each said discharge, thermionic valve means responsive to said discharge and a reversing switch operable, under the control of said valve means, to reverse said driving means momentarily to retract the probe in response to said discharge and thereafter restore the condition of said driving means for advancing the probe.

3. For use with an elastic-fluid turbine or compressor having a bladed rotor, a device for measuring the distance of the rotor blade tip path from a datum level comprising in combination a movable probe, reversible driving means for advancing the probe point towards and retracting it from said blade tip path, means for indicating the distance of the probe point from said datum level, a capacitor connected across the gap between the probe point and the rotor blading, means for maintaining such a charging potential across the capacitor that the latter will discharge across the gap when the gap width is reduced to a predetermined small value and means operative to retract the probe in response to current in the capacitor circuit and to advance the probe in response to cessation of current in said circuit.

References Cited in the file of this patent

UNITED STATES PATENTS

| | | |
|---|---|---|
| 1,664,265 | Rieber | Mar. 27, 1928 |
| 2,257,764 | Ridgway | Oct. 7, 1941 |
| 2,493,912 | Brown | Jan. 10, 1950 |
| 2,548,696 | Barstow et al. | Apr. 10, 1951 |

U. S. DEPARTMENT OF COMMERCE
PATENT OFFICE

CERTIFICATE OF CORRECTION

Patent No. 2,825,973     Harry Shaw et al.     March 11, 1958

It is hereby certified that error appears in the printed specification of the above numbered patent requiring correction and that the said Letters Patent should read as corrected below.

Column 5, line 51, after "tip" insert -- clearance is becoming dangerously small. It is not usually --.

Signed and sealed this 10th day of June 1958.

(SEAL)
Attest:
KARL H. AXLINE

Attesting Officer

ROBERT C. WATSON
Commissioner of Patents